US012608964B2

(12) United States Patent
Lu

(10) Patent No.: US 12,608,964 B2
(45) Date of Patent: Apr. 21, 2026

(54) NOTE INFORMATION DISPLAY METHOD, NOTE INFORMATION SENDING METHOD, AND ELECTRONIC DEVICE

(71) Applicant: VIVO MOBILE COMMUNICATION CO., LTD., Guangdong (CN)

(72) Inventor: Peirui Lu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 347 days.

(21) Appl. No.: 17/706,760

(22) Filed: Mar. 29, 2022

(65) Prior Publication Data

US 2022/0215680 A1 Jul. 7, 2022

Related U.S. Application Data

(63) Continuation of application No. PCT/CN2020/105240, filed on Jul. 28, 2020.

(30) Foreign Application Priority Data

Sep. 29, 2019 (CN) .......................... 201910935536.5

(51) Int. Cl.
*G06V 20/64* (2022.01)
*G06F 21/31* (2013.01)
(Continued)

(52) U.S. Cl.
CPC .............. *G06V 20/70* (2022.01); *G06F 21/31* (2013.01); *G06F 21/6209* (2013.01); *G06V 20/64* (2022.01)

(58) Field of Classification Search
CPC ......... B60W 60/0027; B60W 50/0097; B60W 2554/4029; B60W 2556/35; G06N 3/08;
(Continued)

(56) References Cited

U.S. PATENT DOCUMENTS 8,063,797 B1 * 11/2011 Sonnabend .......... G08G 1/0129
340/932.2
10,539,787 B2 * 1/2020 Haddick ............... G06F 3/0428
(Continued)

FOREIGN PATENT DOCUMENTS

CA 3028753 A1 * 7/2019 ........... G06Q 20/202
CA 3106014 A1 * 1/2020 ............. A01B 43/00
(Continued)

OTHER PUBLICATIONS

First Office Action for Chinese Application No. 201910935536.5, dated Jul. 31, 2020, 8 Pages.
(Continued)

*Primary Examiner* — Marcos L Torres
(74) *Attorney, Agent, or Firm* — BROOKS KUSHMAN P.C.

(57) ABSTRACT
A note information display method, a note information sending method, and an electronic device, and relate to the field of terminal technologies. The note information display method includes: collecting a first image, where the first image includes an image of a first object; identifying the first image to obtain first information, where the first information is feature information of the first object; sending the first information to a server; receiving first note information that corresponds to the first information and that is sent by the server; and displaying the first note information.

6 Claims, 10 Drawing Sheets

(51) Int. Cl.
*G06F 21/62* (2013.01)
*G06V 20/70* (2022.01)

(58) Field of Classification Search
CPC ........ G06N 3/044; G06N 3/045; G06N 20/00; G06V 20/58; G08G 1/166; G01C 21/3492; G01C 21/1652; G01C 21/3415; G01S 13/58; G01S 13/867; G01S 13/931; G01S 19/49
See application file for complete search history.

(56) References Cited

U.S. PATENT DOCUMENTS

| | | | | |
|---|---|---|---|---|
| 10,952,014 | B2 * | 3/2021 | Yang | G06Q 30/0639 |
| 11,288,511 | B2 * | 3/2022 | Desai | G06V 40/172 |
| 2002/0082961 | A1 * | 6/2002 | Abrahm | G06Q 20/10 705/35 |
| 2011/0007077 | A1 | 1/2011 | Kamath et al. | |
| 2011/0208817 | A1 * | 8/2011 | Toledano | H04W 4/80 709/206 |
| 2012/0202514 | A1 * | 8/2012 | Kadirkamanathan | G06V 20/20 455/456.1 |
| 2012/0290591 | A1 * | 11/2012 | Flynn | G06F 16/5866 707/754 |
| 2013/0124518 | A1 | 5/2013 | Ikenoue et al. | |
| 2014/0105397 | A1 * | 4/2014 | Ikeda | H04N 1/00342 380/270 |
| 2018/0349736 | A1 * | 12/2018 | Bapat | G06V 20/53 |
| 2019/0089934 | A1 * | 3/2019 | Goulden | G08B 7/06 |
| 2019/0272428 | A1 | 9/2019 | Li et al. | |
| 2020/0192089 | A1 * | 6/2020 | Haddick | G06F 3/005 |
| 2021/0174097 | A1 * | 6/2021 | Tsai | G06T 7/70 |

FOREIGN PATENT DOCUMENTS

| | | | | | |
|---|---|---|---|---|---|
| CN | 102737228 | A | * | 10/2012 | G06F 16/583 |
| CN | 103002410 | A | | 3/2013 | |
| CN | 103106236 | A | | 5/2013 | |
| CN | 103814545 | A | * | 5/2014 | G06F 21/32 |
| CN | 105323252 | A | | 2/2016 | |
| CN | 105468142 | A | | 4/2016 | |
| CN | 107358639 | A | | 11/2017 | |
| CN | 108304067 | A | | 7/2018 | |
| CN | 108415974 | A | | 8/2018 | |
| CN | 108769269 | A | | 11/2018 | |
| CN | 108984242 | A | | 12/2018 | |
| CN | 110677537 | A | | 1/2020 | |
| EP | 2362627 | A1 | | 8/2011 | |
| JP | 2009251774 | A | | 10/2009 | |
| JP | 2013105345 | A | | 5/2013 | |
| WO | WO-2007130688 | A2 | * | 11/2007 | G06K 9/00671 |
| WO | 2019127832 | A1 | | 7/2019 | |

OTHER PUBLICATIONS

International Search Report and Written Opinion for Application No. PCT/CN2020/105240, dated Oct. 28, 2020, 10 Pages.
Extended European Search Report for Application No. 20867416.8, dated Oct. 17, 2022, 11 Pages.
First Office Action for Japanese Application No. 2022-519542, dated Apr. 24, 2023, 4 Pages.

* cited by examiner

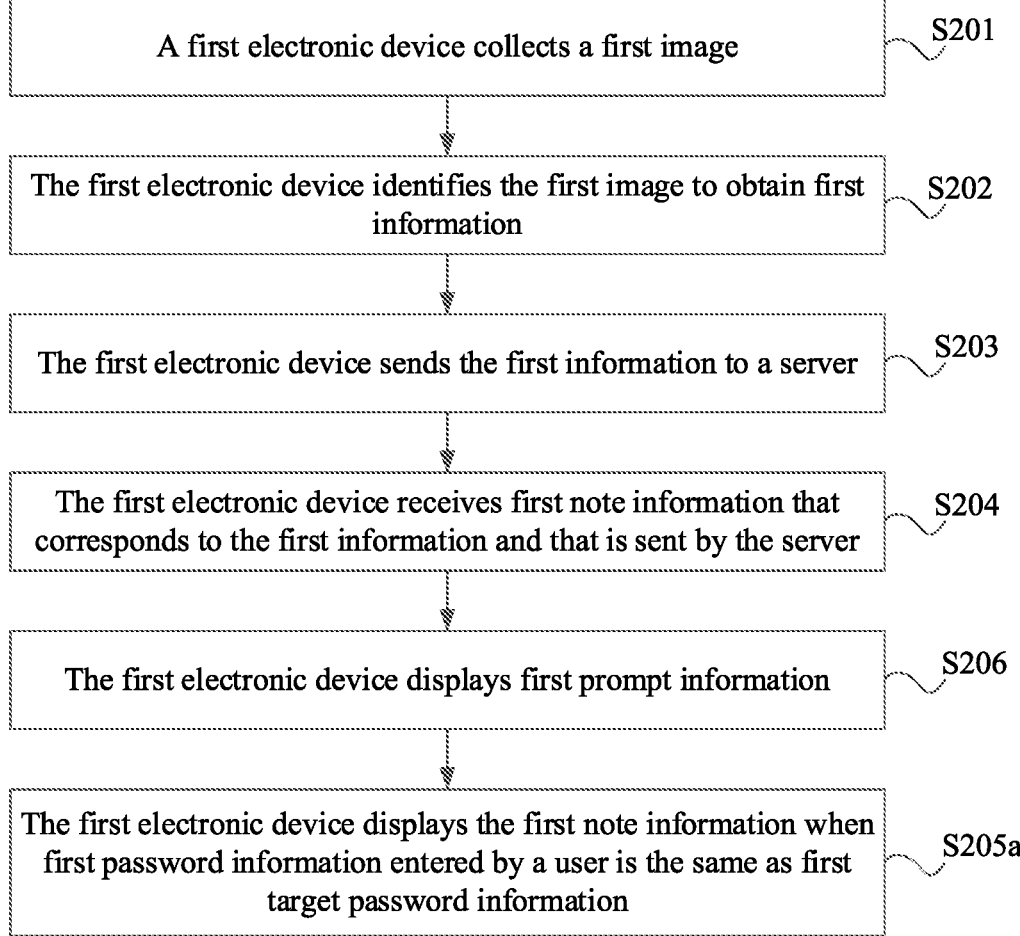

A first electronic device collects a first image ⌇~S201

The first electronic device identifies the first image to obtain first information ⌇~S202

The first electronic device sends the first information to a server ⌇~S203

The first electronic device receives first note information that corresponds to the first information and that is sent by the server ⌇~S204

The first electronic device displays first prompt information ⌇~S206

The first electronic device displays the first note information when first password information entered by a user is the same as first target password information ⌇~S205a

FIG. 3

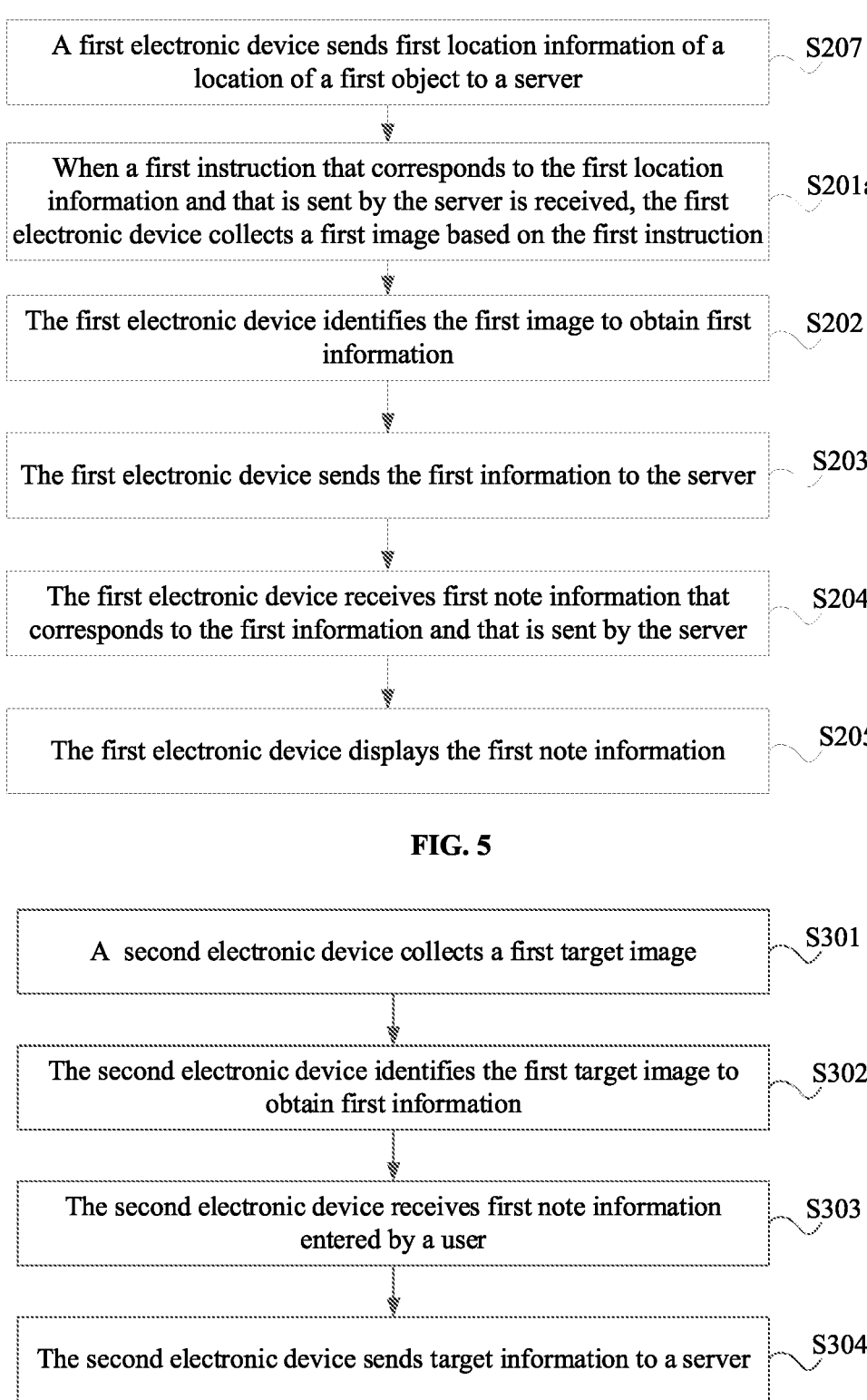

A first electronic device sends first location information of a location of a first object to a server — S207

When a first instruction that corresponds to the first location information and that is sent by the server is received, the first electronic device collects a first image based on the first instruction — S201a The first electronic device identifies the first image to obtain first information — S202

The first electronic device sends the first information to the server — S203

The first electronic device receives first note information that corresponds to the first information and that is sent by the server — S204

The first electronic device displays the first note information — S205

FIG. 5

A second electronic device collects a first target image — S301

The second electronic device identifies the first target image to obtain first information — S302

The second electronic device receives first note information entered by a user — S303

The second electronic device sends target information to a server — S304

FIG. 6

NOTE INFORMATION DISPLAY METHOD, NOTE INFORMATION SENDING METHOD, AND ELECTRONIC DEVICE

CROSS REFERENCE TO RELATED APPLICATIONS

This application is a continuation application of International Application No. PCT/CN2020/105240 filed on Jul. 28, 2020, which claims priority to Chinese Patent Application No. 201910935536.5 filed on Sep. 29, 2019, which are incorporated herein by reference in their entireties.

TECHNICAL FIELD

Embodiments of the present disclosure relate to the field of terminal technologies, and in particular, to a note information display method, a note information sending method, and an electronic device.

BACKGROUND

With the continuous improvement of intelligence of electronic devices, applications in the electronic devices have more and more functions.

In the related art, a user may scan a quick response code through a quick response code scanning function of some applications to complete some operations, to meet user needs. For example, the user may scan a payment quick response code through a quick response code scanning function in a payment application to complete a payment operation, or the user may scan a quick response code of another user through a quick response code scanning function in a communication application to complete a friend adding operation.

However, a quick response code must be compiled according to predetermined rules and the quick response code needs to have a carrier before it can be presented to a user (that is, the quick response code needs to be displayed on a screen or printed on paper). As a result, a process of completing an operation by scanning a quick response code is not flexible enough.

SUMMARY

Embodiments of the present disclosure provide a note information display method, a note information sending method, and an electronic device.

According to a first aspect, an embodiment of the present disclosure provides a note information display method, where the method is applied to a first electronic device, and the method includes: collecting a first image; identifying the first image to obtain first information; then sending the first information to a server; receiving first note information that corresponds to the first information and that is sent by the server; and finally displaying the first note information, where the first image includes an image of a first object, and the first information is feature information of the first object.

According to a second aspect, an embodiment of the present disclosure provides a note information sending method, where the method is applied to a second electronic device, and the method includes: collecting a first target image; identifying the first target image to obtain first information; then receiving first note information entered by a user; and sending target information to a server, where the target information includes the first information and the first note information that corresponds to the first information, the first target image includes an image of a first object, and the first information is feature information of the first object.

According to a third aspect, an embodiment of the present disclosure provides an electronic device, where the electronic device may include: a collection module, an identification module, a first sending module, a receiving module, and a display module, where the collection module is configured to collect a first image, where the first image includes an image of a first object; the identification module is configured to identify the first image collected by the collection module to obtain first information, where the first information is feature information of the first object; the first sending module is configured to send the first information identified by the identification module to a server; the receiving module is configured to receive first note information that corresponds to the first information sent by the first sending module and that is sent by the server; and the display module is configured to display the first note information received by the receiving module.

According to a fourth aspect, an embodiment of the present disclosure provides an electronic device, where the electronic device may include: a collection module, an identification module, a receiving module, and a sending module, where the collection module is configured to collect a first target image, where the first target image includes an image of a first object; the identification module is configured to identify the first target image collected by the collection module to obtain first information, where the first information is feature information of the first object; the receiving module is configured to receive first note information entered by a user; and the sending module is configured to send target information to a server, where the target information includes the first information identified by the identification module and the first note information that corresponds to the first information and that is received by the receiving module.

According to a fifth aspect, an embodiment of the present disclosure provides an electronic device, where the electronic device includes: a processor, a memory, and a computer program that is stored in the memory and that is capable of running on the processor, and when the computer program is executed by the processor, steps of the note information display method according to the foregoing first aspect are implemented, or steps of the note information sending method according to the foregoing second aspect are implemented.

According to a sixth aspect, an embodiment of the present disclosure provides a computer-readable storage medium, where the computer-readable storage medium stores a computer program, and when the computer program is executed by a processor, steps of the note information display method according to the foregoing first aspect are implemented, or steps of the note information sending method according to the foregoing second aspect are implemented.

BRIEF DESCRIPTION OF DRAWINGS

FIG. 3 is a second schematic diagram of a note information display method according to an embodiment of the present disclosure;

FIG. 5 is a third schematic diagram of a note information display method according to an embodiment of the present disclosure;

FIG. 6 is a schematic diagram of a note information sending method according to an embodiment of the present disclosure;

DETAILED DESCRIPTION

Figure 1:
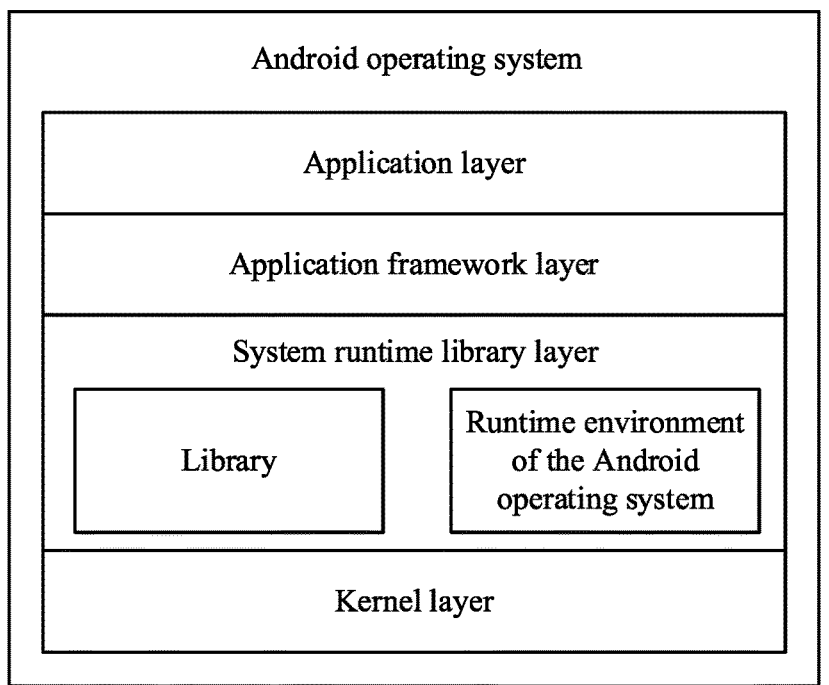
FIG. 1 is a schematic architectural diagram of an Android operating system according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

In this specification, the term "and/or" is merely an association relationship that describes associated objects, and represents that there may be three relationships. For example, A and/or B may represent three cases: only A exists, both A and B exist, and only B exists. A character "/" in this specification indicates an "or" relationship between associated objects. For example, A/B indicates A or B.

In this specification, the terms such as "first" and "second" are used to distinguish between different objects, but are not used to describe a particular sequence of the objects. For example, a first image, a second image, and the like are used to distinguish between different images, but are not used to describe a particular sequence of the images.

In the embodiments of the present disclosure, the word such as "example" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

In the description of the embodiments of the present disclosure, unless otherwise specified, the meaning of "a plurality of" means two or more. For example, a plurality of elements mean two or more elements.

According to an aspect, an embodiment of the present disclosure provides a note information display method and an electronic device. The electronic device may collect a first image (the first image includes an image of a first object), identify the first image to obtain first information (the first information is feature information of the first object), and then send the first information to a server, so that the server searches for the first information in the server, and sends first note information corresponding to the first information to the electronic device when the first information is found, that is, the electronic device receives the first note information sent by the server and displays the first note information. In this solution, a user may trigger feature information of an object and note information to be pre-stored in a server. Therefore, when the user needs to process a specific object, the user may trigger the electronic device to obtain note information based on feature information of the object, so that the user can process the object based on the note information. In this way, in this embodiment of the present disclosure, note information used to process an object can be directly obtained based on the object without using another object (for example, a quick response code). Therefore, flexibility of obtaining note information can be improved, thereby improving flexibility of processing an object.

According to another aspect, an embodiment of the present disclosure provides a note information sending method and an electronic device. The electronic device may collect a first target image (the first target image includes an image of a first object), identify the first target image to obtain first information (the first information is feature information of the first object), then receive first note information entered by a user, and send target information (the target information includes the first information and the first note information corresponding to the first information) to a server. In this solution, a user may trigger the electronic device to send a note and endow the note with information according to an actual usage requirement of the user. Therefore, there is no need to perform an operation as in the related art: obtaining a quick response code of first note information by compiling the quick response code according to predetermined rules, thereby simplifying a process of making a note. In addition, in a process of making a note, privacy and security of note information can be guaranteed by setting a public manner of the note information.

The electronic device in the embodiments of the present disclosure may be an electronic device with an operating system. The operating system may be an Android (Android) operating system, or may be an iOS operating system or another possible operating system, which is not specifically limited in the embodiments of the present disclosure.

The following uses the Android operating system as an example to introduce a software environment applicable to the note information display method and the note information sending method provided in the embodiments of the present disclosure.

FIG. 1 is a schematic architectural diagram of a possible Android operating system according to an embodiment of the present disclosure. In FIG. 1, the architecture of the Android operating system includes 4 layers, which are an application layer, an application framework layer, a system runtime library layer, and a kernel layer (which may be specifically a Linux kernel layer).

The application layer includes various applications in the Android operating system (that include system applications and third-party applications).

The application framework layer is an application framework, and a developer may develop some applications based on the application framework layer following a rule of developing the application framework.

The system runtime library layer includes a library (also referred to as a system library) and a running environment of the Android operating system. The library mainly provides various resources needed by the Android operating system. The running environment of the Android operating system is used for providing a software environment for the Android operating system.

The kernel layer is the operating system layer of the Android operating system and belongs to the lowest layer of software hierarchy of the Android operating system. The kernel layer provides core system services and hardware-related drivers for the Android operating system based on the Linux kernel.

The Android operating system is used as an example. In the embodiments of the present disclosure, based on the system architecture of the Android operating system shown in FIG. 1, developers can develop software programs that implement the note information display method and the note information sending method provided in the embodiments of the present disclosure, so that the note information display method and the note information sending method can be performed based on the Android operating system shown in FIG. 1. That is, by running the software program in the Android operating system, the processor or the electronic device can implement the note information display method or the note information sending method provided in the embodiments of the present disclosure.

The electronic device in the embodiments of the present disclosure may be a mobile electronic device or a non-mobile electronic device. For example, the mobile electronic device may be a mobile phone, a tablet computer, a laptop computer, a palmtop computer, an in-vehicle terminal, a wearable device, an ultra-mobile personal computer (ultra-mobile personal computer, UMPC), a netbook, or a personal digital assistant (personal digital assistant, PDA). The non-mobile electronic device may be a personal computer (personal computer, PC), a television (television, TV), an automated teller machine or a self-service machine. This is not specifically limited in the embodiments of the present disclosure.

The executor of the note information display method and the note information sending method provided in the embodiments of the present disclosure may be the foregoing electronic device, or may be a functional module and/or a functional entity that can implement the note information display method and the note information sending method in the electronic device. This may be specifically determined based on an actual usage requirement and is not limited in the embodiments of the present disclosure. The following uses an electronic device as an example to describe the note information display method and the note information sending method provided in the embodiments of the present disclosure.

In the embodiments of the present disclosure, when a user needs to process a specific object but does not know how to process the object, the user may trigger the electronic device (for example, a first electronic device in the following embodiment) to collect feature information of the object, and send the feature information of the object to a server. The server searches for the feature information in the server and sends note information corresponding to the feature information to the electronic device after the feature information is found. Then, after receiving the note information sent by the server, the electronic device may display the note information, so that the user can process the object based on the note information. In other words, when the user needs to process a specific object, the user may trigger a specific electronic device to obtain note information used to process the object through feature information of the object, so that the user can process the object based on the note information. In this way, in the embodiments of the present disclosure, note information used to process an object can be directly obtained based on the object without using another object (for example, a quick response code). Therefore, flexibility of obtaining note information can be improved, thereby improving flexibility of processing an object.

The foregoing note information may be pre-stored in a server by triggering another electronic device (for example, a second electronic device in the following embodiments) by a user. A method for the user to trigger the another electronic device to prestore the note information is described in detail in the following embodiments, and details are not repeated herein.

It should be noted that, the electronic device provided in the embodiments of the present disclosure may support a video code protocol. Specifically, when the electronic device supports a video code protocol, a camera application of the electronic device may include a video code mode. In the video code mode, the electronic device may obtain note information used to process a specific object. Specifically, the electronic device may perform the method in the embodiments of the present disclosure to obtain note information used to process a specific object.

In the embodiments of the present disclosure, the camera application of the electronic device may further include a video mode, a photo mode, a panorama mode, and modes supported in other possible scenarios. In the video mode, the electronic device may perform a video shooting operation; in the photo mode, the electronic device may perform a photo shooting operation; and in the panorama mode, the electronic device may perform a panorama shooting operation.

In the embodiments of the present disclosure, two processes may be included: one process is a process of displaying a note, and the other process is a process of making a note. To distinguish the electronic device in one of the processes from the electronic device in the other process, in the following embodiments, the electronic device in the process of displaying a note is referred to as a first electronic device, and the electronic device in the process of making a note is referred to as a second electronic device.

In the embodiments of the present disclosure, the foregoing first electronic device and second electronic device may be a same electronic device, or may be different electronic devices. This may be specifically determined according to an actual usage requirement, and is not limited in the embodiments of the present disclosure.

The following uses examples to describe the foregoing process of displaying a note (namely, the note information display method provided in the embodiments of the present disclosure) below with reference to the accompanying drawings.

Figure 2:
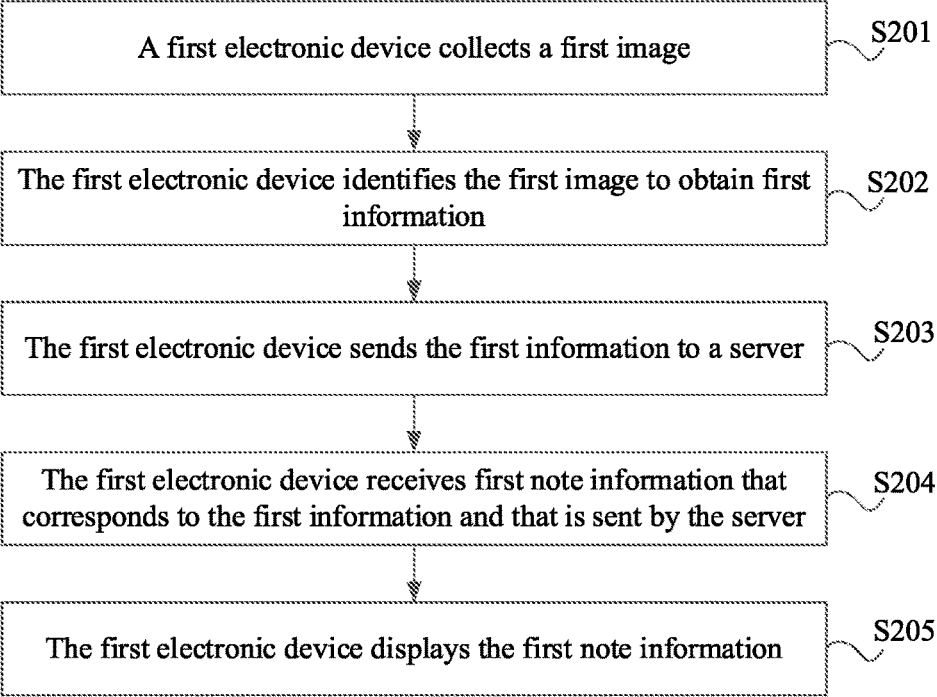
FIG. 2 is a first schematic diagram of a note information display method according to an embodiment of the present disclosure.

As shown in FIG. 2, an embodiment of the present disclosure provides a note information display method. The method may be applied to the foregoing first electronic device, and may include the following steps S201 to S205.

S201: The first electronic device collects a first image.

The foregoing first image may include an image of a first object.

Optionally, in this embodiment of the present disclosure, the first electronic device may collect the image of the first object by using a camera, to obtain the first image.

It should be noted that, in this embodiment of the present disclosure, before the first electronic device collects the first image, the user may trigger the first electronic device to determine the first object. Specifically, in this embodiment of the present disclosure, the user may circle (for example, tap) the first object in a preview screen of a camera application of the first electronic device to trigger the first electronic device to determine the first object.

Optionally, in this embodiment of the present disclosure, the foregoing step S201 may be specifically implemented by using the following step S201a.

S201a: The first electronic device collects the first image when a camera application of the first electronic device is in a video code mode.

It may be understood that, in this embodiment of the present disclosure, the foregoing first object may be an object that the user triggers the first electronic device to select in the preview screen of the camera application of the first electronic device when the camera application of the first electronic device is in the video code mode. For example, assuming that the preview screen of the camera application includes objects such as a "cup", a "human", and the like, the user may trigger the first electronic device to select any one of the "cup" or the "human" as the first object.

S202: The first electronic device identifies the first image to obtain first information.

The foregoing first information may be feature information of the first object.

In this embodiment of the present disclosure, after the first electronic device collects the image of the first object to obtain the first image, the first electronic device may identify the first image by using an image recognition algorithm, to obtain the feature information of the first object, namely, the first information. The image recognition algorithm may be any possible image recognition algorithm such as a face recognition algorithm (used to identify a face image) or a clustering analysis algorithm (used to identify an object image), which may be specifically determined according to an actual usage requirement, and is not limited in the embodiments of the present disclosure.

Optionally, in this embodiment of the present disclosure, the foregoing feature information of the first object may include at least one of color information, dimension information, and shape information of the first object. The color information may include color types, a proportion of each color, and the like; the dimension information may include a length, a width, a height, and the like; and the shape information may include shape types, a bending degree, and the like. This may be specifically determined according to an actual usage requirement, and is not limited in the embodiments of the present disclosure.

S203: The first electronic device sends the first information to a server.

In this embodiment of the present disclosure, after the first electronic device sends the first information to the server, the server may receive the first information.

It should be noted that, in this embodiment of the present disclosure, feature information of an object and note information used for a user to process the object may be prestored in a server. Specifically, a plurality of pieces of information may be prestored in the server. Each piece of information includes feature information of an object and note information used for a user to process the object, that is, feature information of each object and note information used for a user to process the object are stored in the server in a corresponding manner. In this way, when the server receives feature information, sent by a first electronic device, of a specific object, the server may search for the feature information in the server. If the server finds the feature information, the server may send note information stored with the feature information in a corresponding manner to the first electronic device, so that after the first electronic device displays the note information, the user can process the object based on the note information.

In this embodiment of the present disclosure, after the server receives the foregoing first information, the server may find whether there is the first information in the server.

It should be noted that, in this embodiment of the present disclosure, if the server finds the first information in the server, the first electronic device may continue to perform the following step S204. If the server does not find the first information in the server, the server may not send any message to the first electronic device. In this way, in a preset time period within which the first electronic device sends the first information, if the first electronic device does not receive any message, after the preset time period, the first electronic device may prompt the user that note information corresponding to the first object is not found; or, the server may send a response message (used to indicate that the note information corresponding to the first object is not found in the server) to the first electronic device. In this way, after the first electronic device receives the response message, the first electronic device may prompt the user that the note information corresponding to the first object is not found.

In this embodiment of the present disclosure, when the server finds the first information in the server, the server may send first note information corresponding to the first information to the first electronic device.

S204: The first electronic device receives first note information that corresponds to the first information and that is sent by the server.

In this embodiment of the present disclosure, after the first electronic device sends the first information, the server may search for the first information in the server. When the server finds the first information in the server, the server may send first note information that corresponds to the first information and that is sent by the server to the first electronic device, that is, the first electronic device may receive the first note information sent by the server.

It should be noted that, the foregoing first information may be feature information, prestored in the server, of the first object.

Optionally, in this embodiment of the present disclosure, the foregoing first note information may be information in any possible form, such as text information, picture information, video information, link information, or voice information. This may be specifically determined according to an actual usage requirement, and is not limited in the embodiments of the present disclosure.

S205: The first electronic device displays the first note information.

The foregoing first note information may be used to process the first object.

In this embodiment of the present disclosure, after the first electronic device receives the first note information sent by the server, the first electronic device may display the first note information, so that the user can process the first object based on the first note information.

Optionally, in this embodiment of the present disclosure, the foregoing first note information may be displayed on a display screen of the first electronic device at any position. This may be specifically determined according to an actual usage requirement, and is not limited in the embodiments of the present disclosure.

Optionally, in this embodiment of the present disclosure, before the first electronic device displays the first note information, the first electronic device may display one piece of prompt information, which is used to prompt the user that note information (or may be referred to as a note code) corresponding to the first object is found and whether the note information needs to be displayed. In addition, when the user triggers the first electronic device to display the first note information, the first electronic device may display the first note information, and cancel display of the prompt information; or, when the user does not trigger or trigger the first electronic device to not to display the first note information, the first electronic device may not display the first note information, and cancel display of the prompt information.

In this embodiment of the present disclosure, the user may trigger feature information of an object and note information to be prestored in a server. Therefore, when the user needs to process a specific object, the user may trigger the first electronic device to obtain note information based on feature information of the object, so that the user can process the object based on the note information. In this way, in the embodiments of the present disclosure, note information used to process an object can be directly obtained based on the object without using another object (for example, a quick response code). Therefore, flexibility of obtaining note information can be improved, thereby improving flexibility of processing an object.

Optionally, in this embodiment of the present disclosure, if the first note information is encrypted note information, before the first electronic device displays the first note information, the first electronic device may first display prompt information used to prompt the user to enter a password, to decrypt the first note information.

For example, with reference to FIG. 2, as shown in FIG. 3, before the foregoing step S205, the note information display method provided in this embodiment of the present disclosure may further include the following step S206. In addition, optionally, the foregoing step S205 may be specifically implemented by using the following step S205a.

S206: The first electronic device displays first prompt information.

The foregoing first prompt information may be used to prompt the user to enter password information.

In this embodiment of the present disclosure, if the first note information is encrypted note information, after the first electronic device receives the first note information sent by the server, the first electronic device may first display the first prompt information used to prompt the user to enter password information, to decrypt the first note information.

Optionally, in this embodiment of the present disclosure, the foregoing first prompt information may include first prompt content and a first input area. The first prompt content may be used to prompt the user that the first note information is encrypted and password information needs to be entered for decryption. The first input area may be used for the user to enter the password information.

Figure 4:
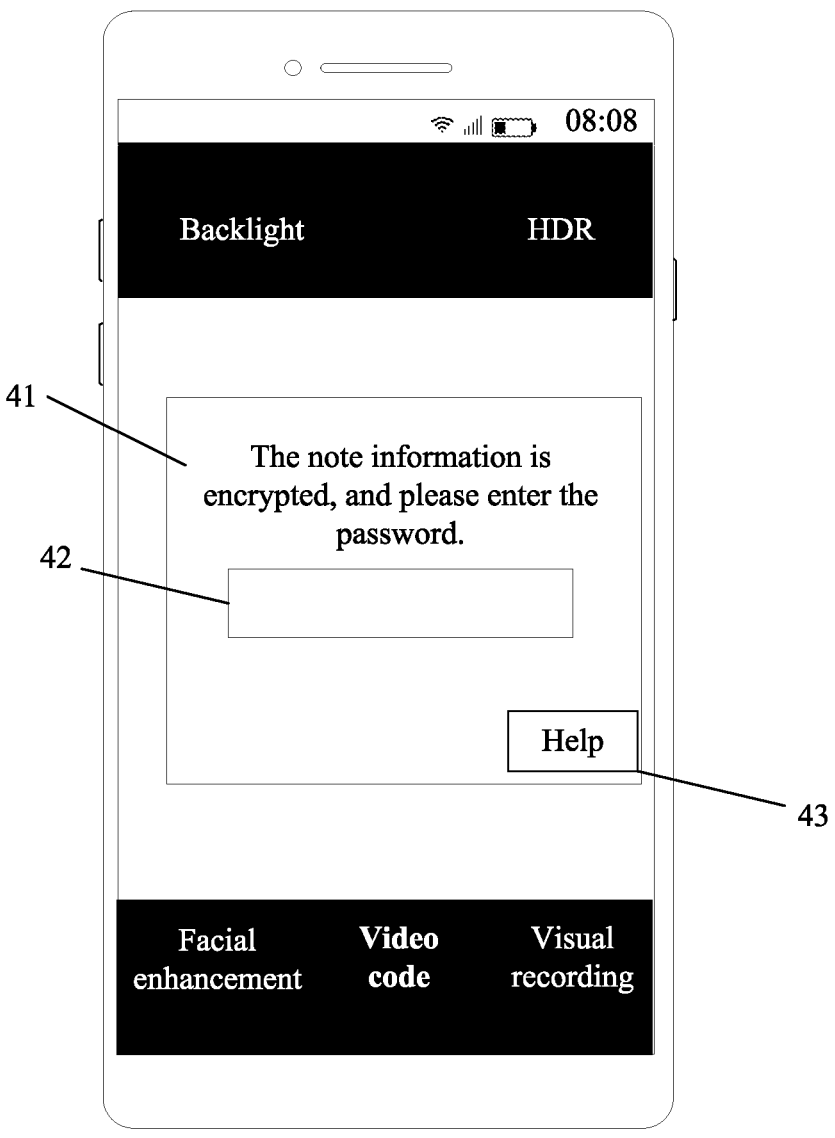
FIG. 4 is a schematic diagram of an interface applied to a note information display method according to an embodiment of the present disclosure.

For example, as shown in FIG. 4, the foregoing first prompt content may be "The note information is encrypted, and please enter the password." (As shown by 41 in FIG. 4). The user may enter password information in the first input area (as shown by 42 in FIG. 4), to decrypt the first note information.

Optionally, in this embodiment of the present disclosure, the foregoing first prompt information may further include a first help option. The first help option may be used to help the user to obtain password information used to encrypt the first note information. Specifically, the first help option may be used to help the user to obtain the password information used to encrypt the first note information when the user does not know the password information.

For example, as shown in FIG. 4, when the user does not know the password information used to encrypt the first note information, the user may tap the first help option (as shown by 43 in FIG. 4) to trigger the first electronic device to send user information of a user of the first electronic device to a target user.

In this embodiment of the present disclosure, it is assumed that a user that needs to process the first object is referred to as a user 1, an electronic device of the user 1 is referred to as an electronic device 1, and an electronic device of the target user is referred to as an electronic device 2. After the electronic device 2 receives user information of the user 1 sent by the electronic device 1, if the target user allows the user 1 to access note information (namely, the foregoing first note information) corresponding to the first object, the target user may trigger the electronic device 2 to send password information to the electronic device 1, that is, the electronic device 1 may receive the password information (namely, password information used to decrypt the first note information) sent by the electronic device 2, so that the electronic device 1 may display the first note information after the first note information is decrypted. If the target user does not allow the user 1 to access the note information (namely, the foregoing first note information) corresponding to the first object, the target user may trigger the electronic device 2 to send an access reject message to the electronic device 1, that is, the electronic device 1 may receive the access reject message, so that the electronic device may prompt the user, based on the access reject message, that the user have no permission to access the first note information.

It should be noted that, the foregoing target user may be a user that triggers an electronic device to make a note. Specifically, for a process of making a note, reference may be made to the following description of a process of making a note. To avoid repetition, details are not described herein.

S205a: The first electronic device displays the first note information when first password information entered by a user is the same as first target password information.

The foregoing first target password information may be password information used to encrypt the foregoing first note information.

In this embodiment of the present disclosure, after the user enters password information (namely, the first password information), the first electronic device may determine whether the first password information entered by the user is the same as password information (namely, the first target password information) used to encrypt the foregoing first note information; and if the first password information is the same as the first target password information, the first electronic device may display the first note information; or if the first password information is different from the first target password information, the first electronic device may prompt the user that the entered password information is incorrect.

In this embodiment of the present disclosure, when the first note information is encrypted, before displaying the first note information, the first electronic device may first prompt the user to enter password information, and display the first note information when the password information entered by the user is correct, so that security of the first note information can be improved, and leakage of the first note information can be prevented. In addition, when the first note information involves private information of the user, leakage of the private information of the user can be prevented.

Optionally, in this embodiment of the present disclosure, before the first electronic device collects the first image, the first electronic device may send location information of a location of a first object to a server. When the server finds the location information in the server, the server may send an instruction to an electronic device, to instruct the electronic device to collect an image of the first object.

For example, with reference to FIG. 2, as shown in FIG. 5, before the foregoing step S201, the note information display method provided in this embodiment of the present disclosure may further include the following step S207. In addition, optionally, the foregoing step S201 may be implemented by using the following step S201a.

S207: The first electronic device sends first location information of a location of the first object to the server.

The foregoing first location information may be used to indicate a geographical location where the first object is located when the first electronic device obtains the first location information.

Optionally, in this embodiment of the present disclosure, location information of the first object may be determined based on location information of the first electronic device. Specifically, the location information of the first object may be location information of a geographical location the first electronic device. In other words, the first electronic device may obtain location information of a geographical location of the first object by obtaining the location information of the geographical location of the first electronic device.

In this embodiment of the present disclosure, when the user triggers the first electronic device to run a camera application; or, when the user triggers the camera application in the first electronic device to switch to a video code mode, a location detection function may be enabled on the first electronic device and used to detect a current location of the first electronic device. In addition, after the user triggers the first electronic device to determine the first object, the first electronic device may use location information of a current geographical location of the first electronic device as location information (namely, the first location information) of the first object and send the location information to the server.

In this embodiment of the present disclosure, the foregoing first location information may be understood as latitude and longitude information of a location of the first object, namely, latitude and longitude information of a location of the first electronic device.

In this embodiment of the present disclosure, after the first electronic device sends the first location information to the server, the server may receive the first location information.

It should be noted that, in this embodiment of the present disclosure, location information of an object may be prestored in the server. Specifically, each piece of information in the foregoing plurality of pieces of information prestored in the server may include not only feature information of an object and note information used for a user to process the object, but also location information of the object, that is, feature information of each object, note information used for a user to process the object, and location information of the object are stored in the server in a corresponding manner. In this way, when the server receives location information, sent by the first electronic device, of a specific object, the server may search for the location information in the server. If the server finds the location information, the server may send a first instruction to the first electronic device to instruct the first electronic device to collect an image of the object and identify the image, so as to obtain feature information of the object. After the first electronic device obtains the feature information of the object, the first electronic device may send the feature information of the object to the server. In this way, when the server receives the feature information, sent by the first electronic device, of the object, the server may search, in the server, for the feature information from feature information corresponding to the location information. If the server finds the feature information, the server may send note information stored with the feature information in a corresponding manner to the first electronic device, so that after the first electronic device displays the note information, the user can process the object based on the note information.

In this embodiment of the present disclosure, after the server receives the foregoing first location information, the server may search for the first location information in the server.

It should be noted that, in this embodiment of the present disclosure, if the server finds the first location information in the server, the server may send a first instruction to the first electronic device. If the server does not find the first location information in the server, the server may not send any message to the first electronic device. In this way, in a preset time period within which the first electronic device sends the first location information, if the first electronic device does not receive any message, after the preset time period, the first electronic device may prompt the user to reselect an object; or, the server may send a response message (used to indicate that location information in accordance with location information of the first object is not found in the server) to the first electronic device. In this way, after the first electronic device receives the response message, the first electronic device may prompt the user to reselect an object. It may be understood that, in this embodiment of the present disclosure, after the user retriggers the first electronic device to determine the first object, the first electronic device may return to the foregoing step S207 to perform this step.

In this embodiment of the present disclosure, when the server finds the first location information, the server may send the first instruction to the first electronic device. The first electronic device may receive the first instruction.

It may be understood that, the foregoing first instruction is sent by the server when the server finds the first location information in the server.

S201a: When a first instruction that corresponds to the first location information and that is sent by the server is received, the first electronic device collects the first image based on the first instruction.

In this embodiment of the present disclosure, after the first electronic device receives the first instruction sent by the server, the first electronic device may start to collect an image of the first object based on the first instruction, to obtain the first image.

In this embodiment of the present disclosure, the first electronic device may start to collect the image of the first object after receiving the first instruction sent by the server, that is, the first electronic device starts to collect the image of the first object only when location information of a current location of the first object is prestored in the server. Therefore, the first electronic device can be prevented from performing unnecessary operations, thereby reducing power consumption of the first electronic device.

The following further uses examples to describe the foregoing process of making a note (namely, the note information sending method provided in the embodiments of the present disclosure) below with reference to the accompanying drawings.

As shown in FIG. 6, an embodiment of the present disclosure provides a note information sending method. The method may be applied to the second electronic device, and may include the following steps S301 to S304.

S301: The second electronic device collects a first target image.

The foregoing first target image includes an image of a first object.

Optionally, in this embodiment of the present disclosure, the foregoing step S301 may be specifically implemented by using the following step S301*a*.

S301*a*: The second electronic device collects the first target image when a camera application of the second electronic device is in a video code mode.

It may be understood that, the foregoing first target image may be an image of a first object in a preview screen of a camera application of the second electronic device when the camera application of the second electronic device is in a video code mode.

Optionally, in this embodiment of the present disclosure, the second electronic device may collect the image of the first object by using a camera, to obtain the first target image.

It may be understood that, in this embodiment of the present disclosure, the foregoing first image is an image, collected in the process of displaying a note, of the first object. The foregoing first target image is an image, collected in the process of making a note, of the first object.

It should be noted that, in this embodiment of the present disclosure, before the second electronic device collects the first target image, the target user needs to trigger the second electronic device to determine the first object. Specifically, in this embodiment of the present disclosure, the target user may circle (for example, tap) the first object in a preview screen of the camera application of the second electronic device to trigger the second electronic device to determine the first object.

Figure 7:
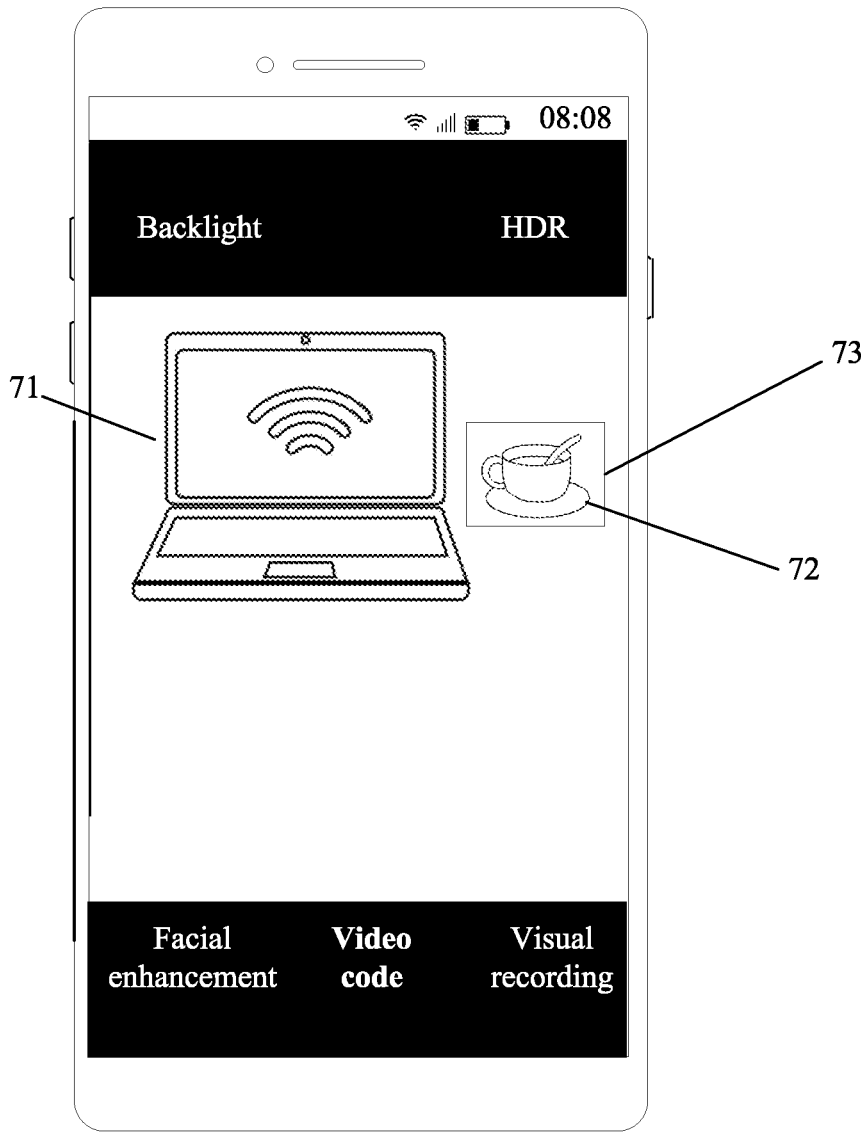
FIG. 7 is a first schematic diagram of an interface applied to a note information sending method according to an embodiment of the present disclosure.

For example, FIG. 7 is a schematic diagram of a preview screen displayed when the camera application of the second electronic device is in a video code mode. The preview screen includes a "computer" (as shown by 71 in FIG. 7) and a "cup" (as shown by 72 in FIG. 7). The target user may tap the "cup" to trigger the second electronic device to determine the "cup" as the first object, or the target user may tap the "computer" to trigger the second electronic device to determine the "computer" as the first object. As shown in FIG. 7, in this embodiment of the present disclosure, that the "cup" is the first object is used as an example. After the target user taps the "cup", a select box may be displayed around the "cup", to prompt the target user that a selected object is the "cup" (as shown by 73 in FIG. 7). Further, after the target user triggers the second electronic device to determine the first object, the second electronic device may collect the image of the first object, to obtain the first target image.

For details about other descriptions of the foregoing step S301, reference may be made to related description of the step S201 in the foregoing embodiment. To avoid repetition, details are not described herein again.

S302: The second electronic device identifies the first target image to obtain first information.

The foregoing first information is feature information of the first object.

In this embodiment of the present disclosure, after the second electronic device collects the image of the first object to obtain the first target image, the second electronic device may identify the first target image by using an image recognition algorithm, to obtain the feature information of the first object, namely, the first information. For specific description of the image recognition algorithm, reference may be made to related description of the image recognition algorithm in the foregoing step S202, and details are not described herein again.

Figure 8:
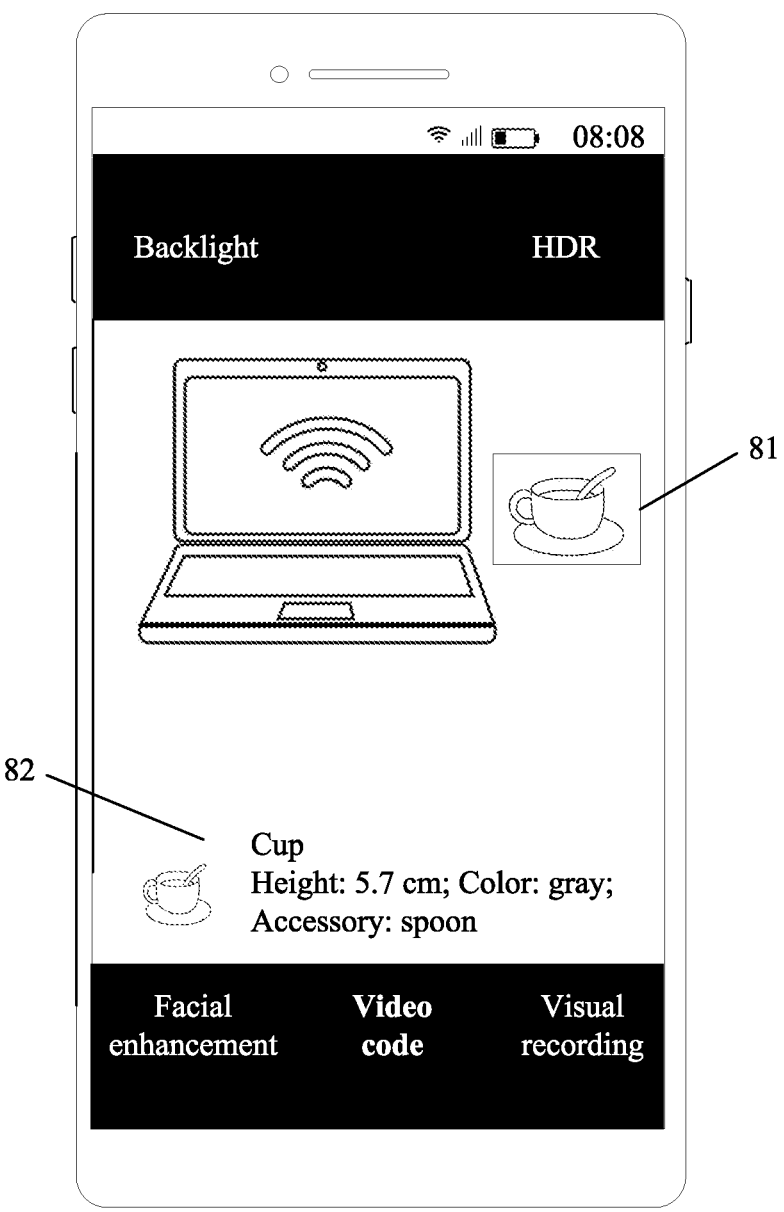
FIG. 8 is a second schematic diagram of an interface applied to a note information sending method according to an embodiment of the present disclosure.

The following further uses examples to describe the foregoing step S302 with reference to FIG. 8.

For example, as shown in FIG. 8, assuming that the first object is a "cup" (as shown by 81 in FIG. 8), the second electronic device may identify the "cup" to obtain feature information of the "cup", and display the feature information (namely, the first information) and an image of the "cup" (as shown by 82 in FIG. 8) in a current interface at a lower right corner. For example, the feature information of the "cup" obtained by the second electronic device is: Height: 5.7 cm; Color: gray; and Accessory: spoon.

Optionally, in this embodiment of the present disclosure, after the second electronic device obtains the feature information of the first object, namely, the foregoing first information, the second electronic device may display the first information in a current interface, so that the target user can view the feature information of the first object.

For details about other descriptions of the foregoing step S302, reference may be made to related description of the step S202 in the foregoing embodiment. To avoid repetition, details are not described herein again.

S303: The second electronic device receives first note information entered by a user.

S304: The second electronic device sends target information to a server.

The foregoing target information includes the first information and the first note information corresponding to the first information.

Figure 9:
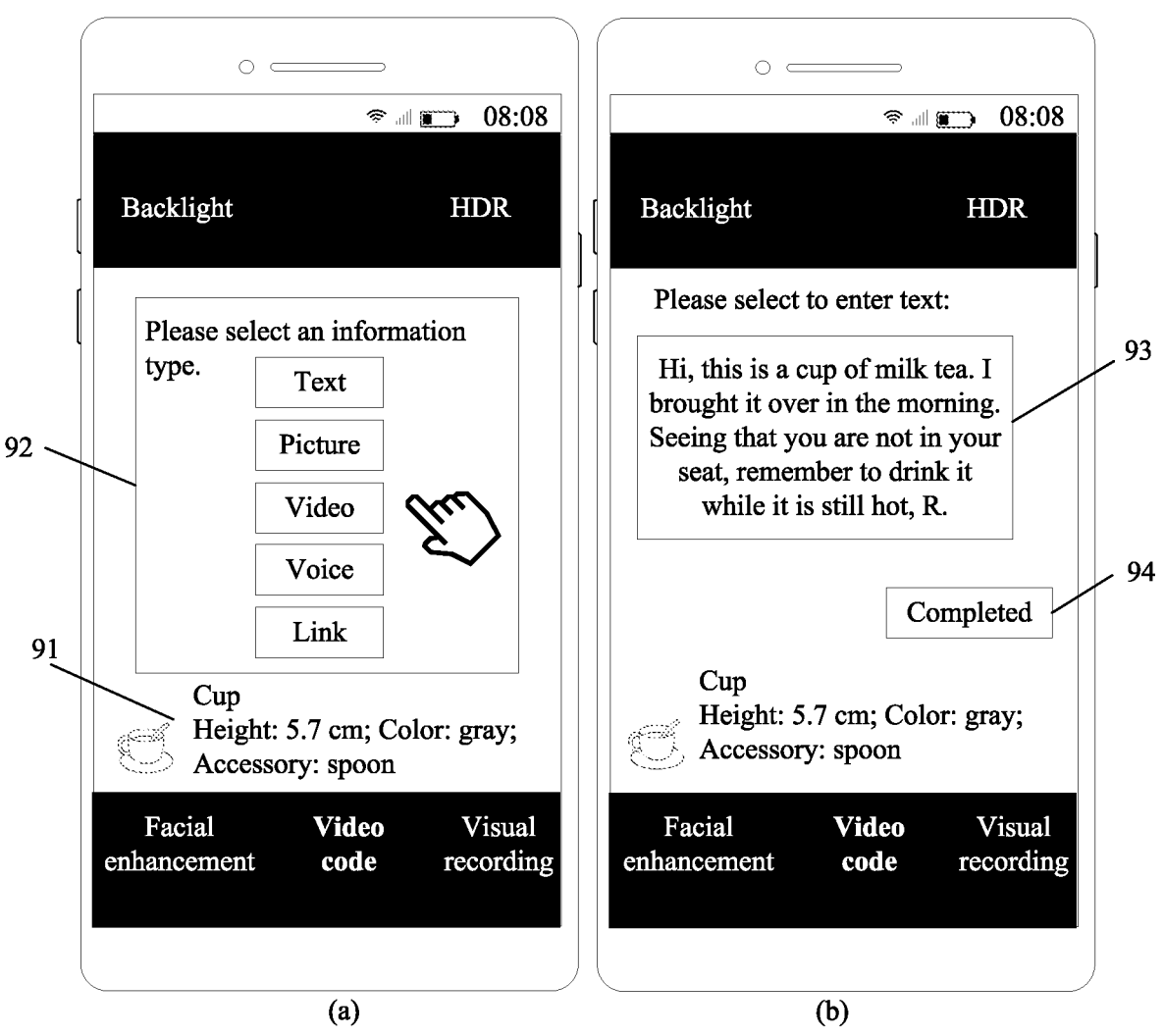
FIG. 9 is a third schematic diagram of an interface applied to a note information sending method according to an embodiment of the present disclosure.

The following further uses examples to describe a process in which the target user triggers the foregoing first note information to be entered with reference to FIG. 9.

For example, it is assumed that the foregoing first object is the "cup". FIG. 9 is a schematic diagram of an interface displayed on the second electronic device and used for the first note information to be entered. After the second electronic device obtains the feature information of the "cup", as shown in FIG. 9(*a*), the second electronic device may display the feature information (namely, the first information) and an image of the "cup" (as shown by 91 in FIG. 9(*a*)) in the interface at a lower right corner. In addition, the second electronic device may display a plurality of note information types (as shown by 92 in FIG. 9(*a*)) for the target user to select a type of the first note information. When the target user selects a text type from the plurality of note information types, the second electronic device may determine the type of the first note information as a text type. In this case, the second electronic device may display an information input area (as shown by 93 in FIG. 9(*b*)) for the target user to enter content of the first note information. As shown in FIG. 9(*b*), the target user may enter the content of the first note information in the information input area. For example, the content of the first note information may be "Hi, this is a cup of milk tea. I brought it over in the morning. Seeing that you are not in your seat, remember to drink it while it is still hot, R." shown in FIG. 9(*b*). Further, after the target user enters the content of the first note information in the information input area, the target user may tap a "Complete" control (as shown by 94 in FIG. 9(*b*)) shown in FIG. 9(*b*) to trigger the second electronic device to send the first note information and the foregoing first information to the server.

In this embodiment of the present disclosure, after the second electronic device sends the foregoing first note information and the feature information of the first object to the server, the server may store the first note information and the feature information of the first object. If the user needs to obtain the first note information, the user may trigger the first electronic device to send the feature information of the first object to the server, so that after the server receives the feature information of the first object, the server may send note information corresponding to the first object, namely, the first note information, to the user.

It may be understood that, in this embodiment of the present disclosure, in the foregoing process of making a note, note information triggered to be entered for a specific object by the target user is note information, for the object, received by the first electronic device from the server in the process of displaying a note.

In this embodiment of the present disclosure, after the second electronic device obtains the first information and the first note information triggered to be entered by the target user, the second electronic device may send the first information and the first note information to the server as target information. Therefore, after the server receives the target information, the target information may be stored in the server. In this way, a process in which the feature information of the first object and the first note information used to process the first object are prestored in the server may be completed, that is, the process of making a note may be completed.

Optionally, in this embodiment of the present disclosure, the foregoing target information may further include third information. The third information may be used to indicate a public manner of the foregoing first note information. In other words, the public manner of the first note information may also be prestored in the server. The third information may be triggered to be set by the target user.

Optionally, the public manner of the foregoing first note information may be any one of the following: public, public after encryption, hidden after encryption, and authorization required after encryption.

In this embodiment of the present disclosure, when the public manner of the foregoing first note information is being public, any user can view the first note information. When the public manner of the foregoing first note information is being public after encryption, any user needs to enter password information to view the first note information. When the public manner of the foregoing first note information is being hidden after encryption, only the target user can view the first note information. When the public manner of the foregoing first note information is being authorization required after encryption, only a user who is authorized by the target user can view the first note information.

It should be noted that, in this embodiment of the present disclosure, when the target user triggers the public manner of the first note information to be set as being public after encryption, the user may trigger the first electronic device to perform the foregoing step S205 when the user needs to display the first note information.

Figure 10:
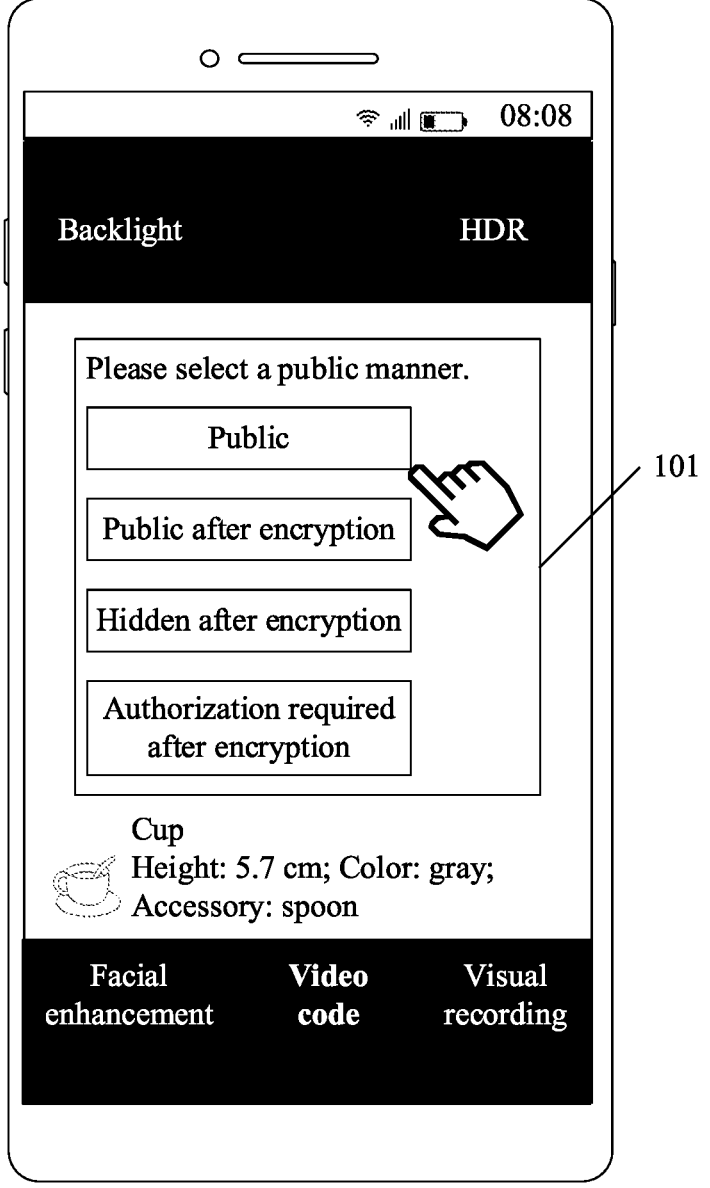
FIG. 10 is a fourth schematic diagram of an interface applied to a note information sending method according to an embodiment of the present disclosure.

The following further uses examples to describe, with reference to FIG. 10, a process in which the target user triggers a public manner of the first note information to be set.

For example, as shown in FIG. 10, after the target user taps the "Complete" control shown by 94 in FIG. 9, the second electronic device may further display prompt information and a plurality of public manners that are shown by 101 in FIG. 10. The prompt information may be used to prompt the target user to select a public manner of the first note information according to an actual usage requirement, so that the target user can select a required public manner from the plurality of public manners, and the second electronic device may further determine the public manner selected by the target user as the public manner of the first note information. It may be understood that, in this embodiment of the present disclosure, as shown in FIG. 10, when the second electronic device displays the prompt information and the plurality of public manners (that is, in the process in which the target user triggers the public manner of the first note information to be set) shown by 101 in FIG. 10, the second electronic device may display the feature information of the first object (namely, the first information) and the image of the first object at a lower right corner.

Optionally, in this embodiment of the present disclosure, the foregoing target information may further include first location information of a location of the first object.

Optionally, in this embodiment of the present disclosure, before the foregoing step S301 is performed, the target user may first trigger the second electronic device to prestore location information of the first object in the server.

In this embodiment of the present disclosure, after the second electronic device sends the first location information to the server, the server may store the first location information in the server, so that when the user needs to obtain the first note information, the server judges the first location information sent by the second electronic device when being triggered by the user.

In this embodiment of the present disclosure, a target user may trigger the second electronic device to send a note and endow the note with information according to an actual usage requirement of the user. Therefore, there is no need to perform an operation as in the related art: obtaining a quick response code of first note information by compiling the quick response code according to predetermined rules, thereby simplifying a process of making a note. In addition, in a process of making a note, privacy and security of note information can be guaranteed by setting a public manner of the note information.

Optionally, in this embodiment of the present disclosure, before the user triggers the first electronic device to perform the process of displaying a note (namely, the note information display method provided in the embodiments of the present disclosure), the user may first trigger the second electronic device to perform the process of making a note (namely, the note information sending method provided in the embodiments of the present disclosure).

It should be noted that, in this embodiment of the present disclosure, the note information display method and the note information sending method illustrated in the accompanying drawings of the foregoing methods are described by using one accompanying drawing in the embodiments of the present disclosure as an example. During specific implementation, the note information display method and the note information sending method illustrated in the accompanying drawings of the foregoing methods may further be implemented with reference to any other accompanying drawings that can be combined in the foregoing embodiment.

Figure 11:
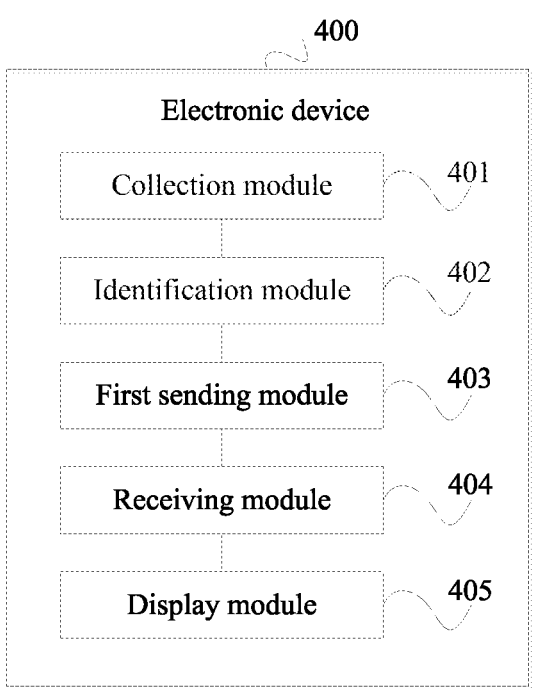
FIG. 11 is a first schematic structural diagram of an electronic device according to an embodiment of the present disclosure.

As shown in FIG. 11, an embodiment of the present disclosure provides an electronic device 400. The electronic device 400 may include a collection module 401, an identification module 402, a first sending module 403, a receiving module 404, and a display module 405. The collection module 401 may be configured to collect a first image, where the first image includes an image of a first object. The identification module 402 may be configured to identify the first image collected by the collection module 401 to obtain first information, where the first information is feature information of the first object. The first sending module 403 may be configured to send the first information identified by the identification module 402 to a server. The receiving module 404 may be configured to receive first note information that corresponds to the first information sent by the first sending module 403 and that is sent by the server. The display module 405 is configured to display the first note information received by the receiving module 404.

Figure 12:
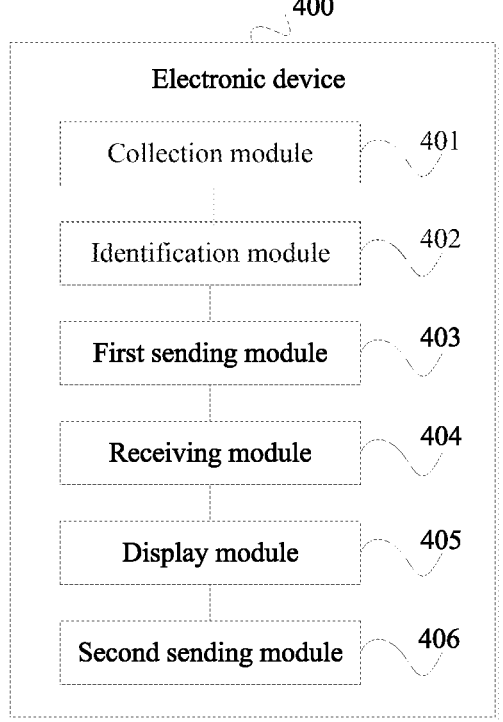
FIG. 12 is a second schematic structural diagram of an electronic device according to an embodiment of the present disclosure.

Optionally, with reference to FIG. 11, as shown in FIG. 12, in this embodiment of the present disclosure, the electronic device 400 may further include a second sending module 406. The second sending module 406 may be configured to send first location information of a location of the first object to the server before the first image is collected by the collection module 401. The collection module 401 may be specifically configured to: when a first instruction that corresponds to the first location information sent by the second sending module 406 and that is sent by the server is received, collect the first image based on the first instruction.

Optionally, in this embodiment of the present disclosure, the foregoing display module 405 may be specifically configured to display the first note information when first password information entered by a user is the same as first target password information.

Optionally, in this embodiment of the present disclosure, the foregoing collection module 401 may be specifically configured to collect the first image when a camera application of the electronic device 400 is in a video code mode.

The electronic device 400 provided in this embodiment of the present disclosure may be the first electronic device in the foregoing method embodiment, and can implement the processes implemented by the first electronic device in the foregoing method embodiment. To avoid repetition, details are not described herein again.

This embodiment of the present disclosure provides an electronic device. The electronic device may collect a first image (the first image includes an image of a first object), identify the first image to obtain first information (the first information is feature information of the first object), and then send the first information to a server, so that the server searches for the first information in the server, and sends first note information corresponding to the first information to the electronic device when the first information is found, that is, the electronic device receives the first note information sent by the server and displays the first note information. In this solution, a user may trigger the electronic device to prestore feature information of an object and note information in a server. Therefore, when the user needs to process a specific object, the user may trigger the electronic device to obtain note information based on feature information of the object, so that the user can process the object based on the note information. In this way, in this embodiment of the present disclosure, note information used to process an object can be directly obtained based on the object without using another object (for example, a quick response code). Therefore, flexibility of obtaining note information can be improved, thereby improving flexibility of processing an object.

Figure 13:
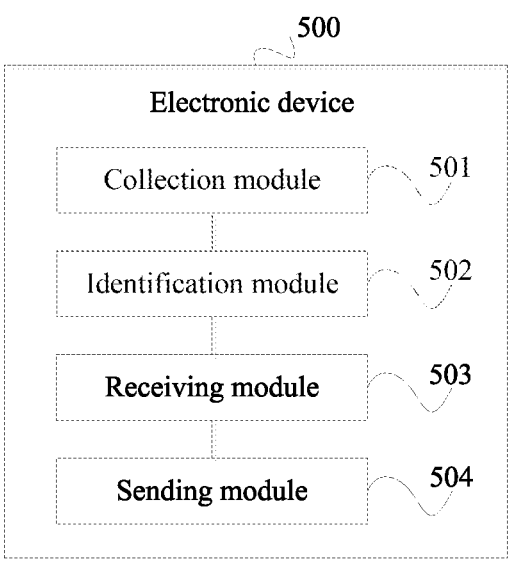
FIG. 13 is a schematic structural diagram of another electronic device according to an embodiment of the present disclosure.

As shown in FIG. 13, an embodiment of the present disclosure provides an electronic device 500. The electronic device 500 may include a collection module 501, an identification module 502, a receiving module 503, and a sending module 504. The collection module 501 may be configured to collect a first target image, where the first target image includes an image of a first object. The identification module 502 may be configured to identify the first target image collected by the collection module 501 to obtain first information, where the first information is feature information of the first object. The receiving module 503 may be configured to receive first note information entered by a user. The sending module 504 may be configured to send target information to a server, where the target information includes the first information identified by the identification module 502 and the first note information that corresponds to the first information and that is received by the receiving module 503.

Optionally, in this embodiment of the present disclosure, the foregoing target information may further include first location information of a location of the first object.

Optionally, in this embodiment of the present disclosure, the foregoing collection module 501 may be specifically configured to collect the first target image when a camera application of the electronic device 500 is in a video code mode.

The electronic device 500 provided in this embodiment of the present disclosure may be the second electronic device in the foregoing method embodiment, and can implement the processes implemented by the second electronic device in the foregoing method embodiment. To avoid repetition, details are not described herein again.

This embodiment of the present disclosure provides an electronic device. The electronic device may collect a first target image (the first target image includes an image of a first object), identify the first target image to obtain first information (the first information is feature information of the first object), then receive first note information entered by a user, and send target information (the target information includes the first information and the first note information corresponding to the first information) to a server. In this solution, a target user may trigger the electronic device to send a note and endow the note with information according to an actual usage requirement of the user. Therefore, there is no need to perform an operation as in the related art: obtaining a quick response code of first note information by compiling the quick response code according to predetermined rules, thereby simplifying a process of making a note. In addition, in a process of making a note, privacy and security of note information can be guaranteed by setting a public manner of the note information.

Figure 14:
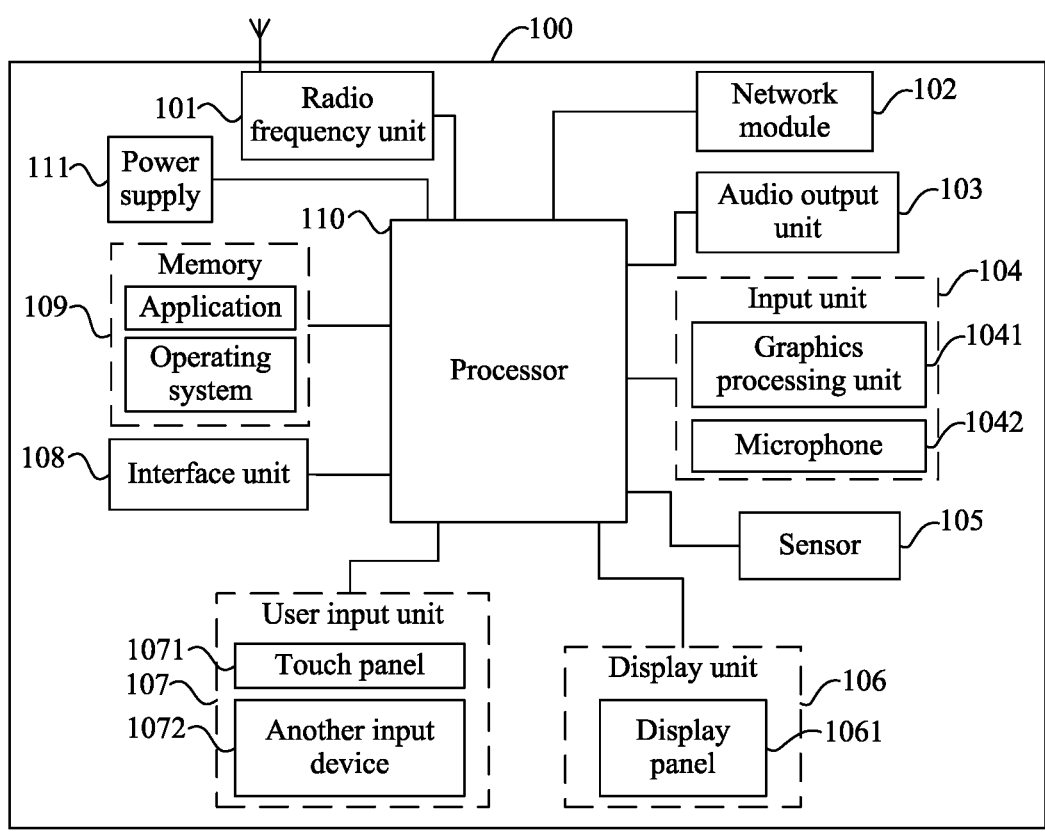
FIG. 14 is a schematic diagram of hardware of an electronic device according to an embodiment of the present disclosure.

FIG. 14 is a schematic diagram of hardware of an electronic device (may be a first electronic device or a second electronic device) for implementing all embodiments of the present disclosure. As shown in FIG. 14, the electronic device 100 includes but is not limited to: a radio frequency unit 101, a network module 102, an audio output unit 103, an input unit 104, a sensor 105, a display unit 106, a user input unit 107, an interface unit 108, a memory 109, a processor 110, a power supply 111, and other components. A person skilled in the art may understand that the structure of the electronic device shown in FIG. 14 constitutes no limitation on the electronic device. The electronic device may include more or fewer components than those shown in the figure, or a combination of some components, or an arrangement of different components. In this embodiment of the present disclosure, the electronic device includes, but is not limited to, a mobile phone, a tablet computer, a notebook computer, a palmtop computer, a vehicle-mounted terminal, a wearable device, a pedometer, or the like.

In this embodiment of the present disclosure, when the electronic device 100 is the first electronic device, the foregoing processor 110 may be configured to collect a first image and identify the first image to obtain first information, where the first image includes an image of the first object, and the first information is feature information of the first object; the radio frequency unit 101 is configured to send the first information to a server, and receive first note information, corresponding to the first information, sent by the server; and the display unit 106 is configured to display the first note information received by the radio frequency unit 101.

It may be understood that, in this embodiment of the present disclosure, the collection module 401 and the identification module 402 in the schematic structural diagram (for example, FIG. 11) of the foregoing first electronic device may be implemented by using the processor 110. The sending module 403 and the receiving module 404 in the schematic structural diagram (for example, FIG. 11) of the foregoing first electronic device may be implemented by using the radio frequency unit 101. The display module in the schematic structural diagram (for example, FIG. 11) of the foregoing first electronic device may be implemented by using the display unit 106.

This embodiment of the present disclosure provides an electronic device. The electronic device may collect a first image (the first image includes an image of a first object), identify the first image to obtain first information (the first information is feature information of the first object), and then send the first information to a server, so that the server searches for the first information in the server, and sends first note information corresponding to the first information to the electronic device when the first information is found, that is, the electronic device receives the first note information sent by the server and displays the first note information. In this solution, a user may trigger feature information of an object and note information to be prestored in a server. Therefore, when the user needs to process a specific object, the user may trigger the electronic device to obtain note information based on feature information of the object, so that the user can process the object based on the note information. In this way, in this embodiment of the present disclosure, note information used to process an object can be directly obtained based on the object without using another object (for example, a quick response code). Therefore, flexibility of obtaining note information can be improved, thereby improving flexibility of processing an object.

In this embodiment of the present disclosure, when the electronic device 100 is the second electronic device, the processor 110 is configured to collect a first target image and identify the first target image to obtain first information, where the first target image includes an image of a first object, and the first information is feature information of the first object; the user input unit 107 is configured to receive first note information entered by a user; and the radio frequency unit 101 is configured to send target information to a server, where the target information includes the first information and the first note information corresponding to the first information.

It may be understood that, in this embodiment of the present disclosure, the collection module 401 and the identification module 402 in the schematic structural diagram (for example, FIG. 13) of the foregoing second electronic device may be implemented by using the processor 110. The receiving module 503 in the schematic structural diagram (for example, FIG. 13) of the foregoing second electronic device may be implemented by using the user input unit 107. The sending module 404 in the schematic structural diagram (for example, FIG. 13) of the foregoing second electronic device may be implemented by using the radio frequency unit 101.

This embodiment of the present disclosure provides an electronic device. The electronic device may collect a first target image (the first target image includes an image of a first object), identify the first target image to obtain first information (the first information is feature information of the first object), then receive first note information entered by a user, and send target information (the target information includes the first information and the first note information corresponding to the first information) to a server. In this solution, a target user may trigger the electronic device to send a note and endow the note with information according to an actual usage requirement of the user. Therefore, there is no need to perform an operation as in the related art: obtaining a quick response code of first note information by compiling the quick response code according to predetermined rules, thereby simplifying a process of making a note. In addition, in a process of making a note, privacy and security of note information can be guaranteed by setting a public manner of the note information.

It should be understood that, in this embodiment of the present disclosure, the radio frequency unit 101 may be configured to receive and transmit information, or receive and transmit signals during a call. Specifically, the radio frequency unit 101 receives downlink data from a base station, and transmits the downlink data to the processor 110 for processing; and in addition, transmits uplink data to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with another device by using a wireless communications system and network.

The electronic device provides users with wireless broadband Internet access through the network module 102, for example, helps users receive and send e-mails, browse web pages, and access streaming media.

The audio output unit 103 can convert audio data received by the radio frequency unit 101 or the network module 102 or stored in the memory 109 into an audio signal, and output the audio signal into sound. Moreover, the audio output unit 103 can further provide audio output related to a specific function performed the electronic device 100 (for example, call signal receiving sound and message receiving sound). The audio output unit 103 includes a loudspeaker, a buzzer, a telephone receiver, and the like.

The input unit 104 is configured to receive an audio signal or a video signal. The input unit 104 may include a graphics processing unit (graphics processing unit, GPU) 1041 and a microphone 1042, and the graphics processing unit 1041 processes image data of a still picture or video obtained by an image capture apparatus (such as a camera) in a video capture mode or an image capture mode. The processed image frame may be displayed on the display unit 106, and the image frame processed by the graphics processing unit 1041 may be stored in the memory 109 (or another storage medium) or sent by the radio frequency unit 101 or the network module 102. The microphone 1042 may receive sound and can process the sound into audio data. The processed audio data may be converted, in a call mode, into a format that may be sent to a mobile communication base station by using the radio frequency unit 101 for output.

The electronic device 100 further includes at least one sensor 105, for example, a light sensor, a motor sensor, and another sensor. Specifically, the light sensor includes an ambient light sensor and a proximity sensor. The ambient light sensor can adjust brightness of a display panel 1061 according to ambient light brightness. The proximity sensor can switch off the display panel 1061 and/or backlight when the electronic device 100 moves close to an ear. As a type of the motion sensor, an accelerometer sensor may detect an acceleration in each direction (generally, three axes), and detect a value and a direction of gravity when the accelerometer sensor is static, and may be configured to recognize an electronic device posture (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, and an infrared sensor. Details are not described herein.

The display unit 106 is configured to display information entered by a user or information provided for a user. The display unit 106 may include a display panel 1061. The display panel 1061 may be configured in a form of a liquid crystal display (liquid crystal display, LCD), an organic light-emitting diode (organic light-emitting diode, OLED), or the like.

The user input unit 107 can be configured to receive entered number or character information, and generate key signal input related to user settings and function control of the electronic device. Specifically, the user input unit 107 includes a touch panel 1071 and another input device 1072. The touch panel 1071 is also referred to as a touchscreen, and may collect a touch operation of the user on or near the touch panel 1071 (for example, an operation performed on or near the touch panel 1071 by the user by using any appropriate object or accessory such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 110, and receives and executes a command sent by the processor 110. In addition, the touch panel 1071 may be of a resistive type, a capacitive type, an infrared type, a surface acoustic wave type, or the like. The user input unit 107 may include another input device 1072 in addition to the touch panel 1071. Specifically, the another input device 1072 may include but is not limited to a physical keyboard, function keys (for example, a volume control key and an on/off key), a trackball, a mouse, and a joystick. Details are not described herein.

Further, the touch panel 1071 can cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 14, the touch panel 1071 and the display panel 1061 are configured as two independent components to implement input and output functions of the electronic device, in some embodiments, the touch panel 1071 and the display panel 1061 can be integrated to implement the input and output functions of the electronic device. Details are not limited herein.

The interface unit 108 is an interface for connecting an external apparatus and the electronic device 100. For example, the external apparatus may include a wired or wireless headphone port, an external power supply (or a battery charger) port, a wired or wireless data port, a storage card port, a port used to connect to an apparatus having an identification module, an audio input/output (I/O) port, a video I/O port, a headset port, and the like. The interface unit 108 can be configured to receive input from an external apparatus (for example, data information and power) and transmit the received input to one or more elements in the electronic device 100, or can be configured to transmit data between the electronic device 100 and the external apparatus.

The memory 109 may be configured to store a software program and various data. The memory 109 may mainly include a program storage area and a data storage area. The program storage area may store an operating system, an application required for at least one function (for example, a sound playback function or an image playback function), and the like. The data storage area may store data (for example, audio data or an address book) or the like created based on use of the mobile phone. In addition, the memory 109 may include a high-speed random access memory, and may further include a non-volatile memory such as at least one magnetic disk storage device, a flash memory device, or another non-volatile solid-state storage device.

The processor 110 is a control center of the electronic device and connects all parts of the electronic device using various interfaces and circuits. By running or executing software programs and/or modules stored in the memory 109 and by calling data stored in the memory 109, the processor 110 implements various functions of the electronic device and processes data, thus performing overall monitoring on the electronic device. The processor 110 may include one or more processing units. Optionally, an application processor and a modem processor may be integrated into the processor 110. The application processor mainly processes an operating system, a user interface, an application, and the like. The modem processor mainly processes wireless communication. It can be understood that the above-mentioned modem processor may not be integrated in the processor 110.

The electronic device 100 may further include the power supply 111 (such as a battery) supplying power to each component. Preferably, the power supply 111 may be logically connected to the processor 110 by using a power management system, so as to implement functions such as charging management, discharging management and power consumption management by using the power management system.

In addition, the electronic device 100 includes some functional modules not shown. Details are not described herein.

Optionally, an embodiment of the present disclosure further provides an electronic device. The electronic device may include a processor 110, a memory 109, and a computer program that is stored in the memory 109 and that can run on the processor 110. When the computer program is executed by the processor 110, the processes of the foregoing method embodiment (for example, a process in which a first electronic device performs a note display process, or a process in which a second electronic device performs a note making process) are implemented, and a same technical effect can be achieved. To avoid repetition, details are not described herein again.

An embodiment of the present disclosure further provides a computer-readable storage medium. The computer-readable storage medium stores a computer program, and when executing the computer program, a processor implements the processes of the foregoing method embodiments and a same technical effect can be achieved. To avoid repetition, details are not described herein again. The computer-readable storage medium may include a read-only memory (read-only memory, ROM), a random access memory (random access memory, RAM), a magnetic disk, an optical disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

By means of the foregoing description of the implementations, a person skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of the present disclosure essentially or the part contributing to the related technologies may be implemented in a form of a software product. The computer software product is stored in a storage medium (for example, a ROM/RAM, a magnetic disk, or a compact disc), and includes a plurality of instructions for instructing an electronic device (which may be a mobile phone, a computer, a server, an air conditioner, a network device, or the like) to perform the methods described in the embodiments of the present disclosure.

The embodiments of the present disclosure are described above with reference to the accompanying drawings. However, the present disclosure is not limited to the foregoing specific implementations. The foregoing specific implementations are merely exemplary, but are not limiting. Under the enlightenment of the present disclosure, a person of ordinary skill in the art may make many forms without departing from the objective and the scope of the claims of the present disclosure, and all of which fall within the protection of the present disclosure.

The invention claimed is:

1. A note information display method, applied to a first electronic device, wherein the first electronic device is one independent mobile device, and the method comprises:

collecting a first image, wherein the first image comprises an image of a first object selected by a user;

identifying the first image by using an image recognition algorithm to obtain first information, wherein the first information is feature information of the first object;

sending the first information to a server;

receiving first note information that corresponds to the first information and that is sent by the server; and displaying the first note information,

wherein before the collecting a first image, the method further comprises:

sending first location information of a location of the first object to the server; and prompting the user to reselect another object other than the first object when no message is received from the server within a preset time period after sending the first location information; and the collecting a first image specifically comprises:

when a first instruction that corresponds to the first location information and that is sent by the server is received, collecting the first image based on the first instruction;

wherein before displaying the first note information, the method further comprises:

displaying a first prompt information, wherein the first prompt information is used to prompt the user to enter first password information, the first prompt information comprises a help option, and the help option is used to trigger the first electronic device to send user information of the first electronic device to a second electronic device.

2. The method according to claim 1, wherein the displaying the first note information comprises:

displaying the first note information when the first password information entered by the user is the same as first target password information, wherein the first target password information is password information used to encrypt the first note information.

3. The method according to claim 1, wherein the collecting a first image comprises:

collecting the first image when a camera application of the first electronic device is in a video code mode.

4. A first electronic device, comprising a processor, a memory, and a computer program stored in the memory and executable on the processor, wherein the first electronic device is one independent mobile device, and the computer program, when executed by the processor, causes the first electronic device to perform:

collect a first image, wherein the first image comprises an image of a first object selected by a user;

identify the first image by using an image recognition algorithm to obtain first information, wherein the first information is feature information of the first object;

send the first information to a server;

receive first note information that corresponds to the first information and that is sent by the server; and display the first note information, wherein the computer program, when executed by the processor, causes the first electronic device to further perform:

send first location information of a location of the first object to the server; and prompt the user to reselect another object other than the first object when no message is received from the server within a preset time period after sending the first location information; and the computer program, when executed by the processor, causes the first electronic device to further perform:

when a first instruction that corresponds to the first location information and that is sent by the server is received, collect the first image based on the first instruction;

wherein the computer program, when executed by the processor, further causes the first electronic device to perform: before displaying the first note information, display a first prompt information, wherein the first prompt information is used to prompt the user to enter first password information, the first prompt information comprises a help option, and the help option is used to trigger the first electronic device to send user information of the first electronic device to a second electronic device.

5. The first electronic device according to claim 4, wherein the computer program, when executed by the processor, causes the first electronic device to further perform:

display the first note information when the first password information entered by the user is the same as first target password information, wherein the first target password information is password information used to encrypt the first note information.

6. The first electronic device according to claim 4, wherein the computer program, when executed by the processor, causes the first electronic device to further perform:

collect the first image when a camera application of the first electronic device is in a video code mode.

\* \* \* \* \*